(12) United States Patent
Tewari et al.

(10) Patent No.: US 11,436,053 B2
(45) Date of Patent: Sep. 6, 2022

(54) THIRD-PARTY HARDWARE INTEGRATION IN VIRTUAL NETWORKS

(71) Applicant: MICROSOFT TECHNOLOGY LICENSING, LLC, Redmond, WA (US)

(72) Inventors: Rishabh Tewari, Sammamish, WA (US); Abhijeet Kumar, Sammamish, WA (US); Neeraj Motwani, Sammamish, WA (US); Daniel M. Firestone, Redmond, WA (US); Vivek Bhanu, Redmond, WA (US); Madhan Sivakumar, Seattle, WA (US); Michal Czeslaw Zygmunt, Bellevue, WA (US); Deepak Bansal, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 409 days.

(21) Appl. No.: 16/563,785

(22) Filed: Sep. 6, 2019

(65) Prior Publication Data

US 2020/0371842 A1 Nov. 26, 2020

Related U.S. Application Data

(60) Provisional application No. 62/852,939, filed on May 24, 2019.

(51) Int. Cl.
*G06F 9/50* (2006.01)
*G06F 9/445* (2018.01)

(52) U.S. Cl.
CPC ............ *G06F 9/5027* (2013.01); *G06F 9/445* (2013.01); *G06F 9/5077* (2013.01); *G06F 2209/509* (2013.01)

(58) Field of Classification Search
None
See application file for complete search history.

(56) References Cited

U.S. PATENT DOCUMENTS

| 7,738,457 | B2 | 6/2010 | Nordmark et al. | |
|---|---|---|---|---|
| 8,054,832 | B1 * | 11/2011 | Shukla | H04L 45/586 370/389 |
| 8,930,690 | B2 | 1/2015 | Zuo et al. | |
| 9,270,619 | B2 * | 2/2016 | Senniappan | H04L 49/25 |

(Continued)

OTHER PUBLICATIONS

Firestone et al.: "Azure Accelerated Networking: SmartNICs in the Public Cloud" 15the USENIX Symposium NSDI'18, Apr. 9-11, 2018; (Firestone_2018.pdf) (Year: 2018).*

(Continued)

*Primary Examiner* — Hiren P Patel
(74) *Attorney, Agent, or Firm* — Newport IP, LLC; Han K. Gim (57) ABSTRACT

A network appliance is configured to receive a packet having an address of a custom device as a source address. Policies are accessed that are applicable to a virtual network associated with the custom device. The policies are applied to the packet. A hairpin layer redirects the packet to a destination address contained in the packet. For subsequent packets, application of the policies is bypassed to the subsequent packets. Application of the policies is offloaded to an acceleration device.

15 Claims, 7 Drawing Sheets

(56) References Cited

U.S. PATENT DOCUMENTS

| | | | |
|---|---|---|---|
| 9,325,524 B2 | 4/2016 | Banavalikar et al. | |
| 10,037,220 B2 | 7/2018 | Amulothu et al. | |
| 10,050,875 B2* | 8/2018 | Hu | H04L 41/0803 |
| 10,587,510 B2* | 3/2020 | Luo | H04L 45/74 |
| 10,789,199 B2* | 9/2020 | Mundkur | H04L 49/3027 |
| 10,831,523 B2* | 11/2020 | Kochevar-Cureton | G06F 9/45558 |
| 10,862,796 B1* | 12/2020 | Dickinson | H04L 63/1408 |
| 11,102,164 B1* | 8/2021 | Gupta | H04L 45/64 |
| 11,190,406 B1* | 11/2021 | Tewari | H04L 45/66 |
| 11,310,241 B2* | 4/2022 | Srinivasan | H04L 63/1425 |
| 2013/0311675 A1 | 11/2013 | Kancherla | |
| 2014/0108665 A1* | 4/2014 | Arora | H04L 65/1069 709/227 |
| 2017/0177396 A1* | 6/2017 | Palermo | H04L 49/70 |
| 2017/0272400 A1 | 9/2017 | Bansal et al. | |
| 2018/0150654 A1* | 5/2018 | Connor | G09C 1/00 |
| 2018/0176262 A1 | 6/2018 | Kavi | |
| 2018/0241809 A1* | 8/2018 | Gandhi | H04L 45/74 |
| 2018/0262556 A1 | 9/2018 | Firestone | |
| 2018/0278583 A1* | 9/2018 | Cela | H04L 69/12 |
| 2018/0367390 A1 | 12/2018 | Ponnuswamy et al. | |
| 2019/0044812 A1* | 2/2019 | Loftus | H04L 41/0896 |
| 2019/0052480 A1* | 2/2019 | Skidmore | H04L 49/351 |
| 2019/0081899 A1* | 3/2019 | Mundkur | G06F 15/76 |
| 2020/0099656 A1* | 3/2020 | Mittal | H04L 61/256 |
| 2020/0314694 A1* | 10/2020 | Yu | H04W 28/10 |

OTHER PUBLICATIONS

Daniel Firestone; "VFP: A Virtual Switch Platform for Host SDN in the public Cloud", Microsoft, 14th USENIX NSDI '17; Mar. 27-29, 2017; (Firestone_2017.pdf) (Year: 2017).*

Cziva et al.; "Container-based Network Function Virtualization for Software-Defined Networks"; IEEE 2016; (Cziva_2016.pdf; pp. 415-420) (Year: 2016).*

Rozhko et al.; "The Network Management Unit (NMU): Securing Network Access for Direct-Connected FPGAs"; ACM, Feb. 24-26, 2019; (Rozhko_2019.pdf; pp. 232-241) (Year: 2019).*

Caulfield, et al., "Beyond SmartNICs Towards a Fully Programmable Cloud", In Proceedings of the IEEE International Conference High Perform Switching Routing, Jun. 17, 2018, 6 Pages.

Firestone, Daniel, "VFP: A Virtual Switch Platform for Host SDN in the Public Cloud", In Proceedings of the 14th USENIX Symposium on Networked Systems Design and Implementation, Mar. 27, 2017, pp. 315-328.

Hedlund, Brad, "What is a Distributed Firewall?", Retrieved from: http://bradhedlund.com/2013/07/07/what-is-a-distributed-firewall/, Jul. 7, 2013, 7 Pages.

Pudwell, Sam, "Dell EMC Prepares Azure Stack Hybrid Cloud Launch For Second Half Of 2017", Retrieved from: https://www.silicon.co.uk/cloud/dell-emc-azure-stack-211121, May 4, 2017, 3 Pages.

Sandhir, Saurabh, "NuageNetworks+ Nuage Networks Evolves SDN/SD-WAN Platform to Broader Use Cases, Diverse Cloud Environments in Release 4.0—Part 3", Retrieved from: https://www.nuagenetworks.net/blog/rel4-3/, Oct. 28, 2016, 5 Pages.

"Application as Filed in U.S. Appl. No. 16/154,363", Filed Date: Oct. 8, 2018, 56 Pages.

"Hyper-V Virtual Switch Overview", Retrieved From: https://web.archive.org/web/20140712081050/http://technet.microsoft.com/en-us/library/hh831823.aspx, Jul. 12, 2014, 3 Pages.

Firestone, et al., "Azure Accelerated Networking: SmartNICs in the Public Cloud", In Proceedings of the 15th Symposium on Networked Systems Design and Implementation, Apr. 9, 2018, pp. 51-64.

"International Search Report and Written Opinion Issued in PCT Application No. PCT/US20/034257", dated Aug. 20, 2020, 11 Pages.

* cited by examiner

THIRD-PARTY HARDWARE INTEGRATION IN VIRTUAL NETWORKS

PRIORITY APPLICATION

This application claims the benefit of and priority to U.S. Provisional Application No. 62/852,939, filed May 24, 2019, entitled "THIRD PARTY HARDWARE INTEGRATION IN VIRTUAL NETWORKS." the entire contents of which are incorporated herein by reference.

BACKGROUND

A data center is a facility that houses computer systems and various networking, storage, and other related components. Data centers may, for example, be used by service providers to provide computing services to businesses and individuals as a remote computing service or provide "software as a service" (e.g., cloud computing). In some cases, such users may wish to retain use of some of their computing or storage assets, while taking advantage of the cloud computing capabilities of the data center. However, the incorporation of such assets into the data center's networks may raise a number of issues.

It is with respect to these considerations and others that the disclosure made herein is presented.

SUMMARY

In some embodiments, users of a remote computing service may be provided the option of incorporating custom or third-party hardware such as high capacity processing machines or storage devices into their virtual networks in the cloud. In such cases, it is desirable to apply existing user policies to the third-party hardware without impacting the performance of the user's virtual machines in their virtual network. One way this can be accomplished is by programming network devices such as the top-of-rack (ToR) switches for routing traffic into the customer's virtual network. However, the options for programming network devices may be limited. For example, loading the software defined network policy stack on a network device may not be possible due to hardware restrictions and limitations imposed by the manufacturer of the network device.

One way to allow distributed computing (e.g., cloud) environments to provide virtualized networking services that integrate third-party hardware may be to implement a software defined networking (SDN) appliance virtual machine (VM) outside of a user's virtual network. The SDN appliance virtual machine may include one or more network containers (NCs). Each of the network containers may include SDN policies that are applicable to a user's virtual network. Therefore, a user's network container may process inbound and outbound packet traffic according to the SDN policies defined in the user's network container. However, if the SDN policies are enforced by virtual machines running in the network containers, an extra hop into the virtual machine is required that adds to the switching rate and therefore may impact performance.

In some embodiments disclosed herein, a multi-tenant appliance may be implemented which includes a network container for each tenant that incorporates third-party hardware. Each network container may include a hairpin layer to reflect packets before arriving at the tenant's virtual machine(s). In some embodiments, the multi-tenant appliance may apply tenant policies to packet traffic going to and from the third-party hardware. The multi-tenant appliance may, for example, be implemented as an off-load chassis that provides standard interfaces to which the third-party hardware can communicate. The multi-tenant appliance provides a host that the third-party hardware can interface to, alleviating the need for the third-party hardware to host their own interfaces to the virtual network. The multi-tenant appliance may also alleviate the need for VM hosts to run the policy functionality which can slow performance, providing a hardware-based policy service that can enable improved performance.

In one embodiment, the rules may be implemented as virtual filtering platform (VFP) rules that may be offloaded to a field-programmable gate array (FPGA) device which is configured to be a hardware acceleration device so that data traffic will be processed in hardware and minimize impact to software, allowing end-to-end traffic to maintain its line rate without additional latency. Furthermore, the hairpin layer may allow for software processing of packets to be avoided. Thus the data traffic does not reach the virtual machine but gets reflected and is directed to the outbound rules. Since these are VFP rules that can get offloaded to the FPGA, traffic will be processed in hardware and not impact the software so that the end-to-end traffic will be seen at the line rate without additional latency.

In one example, a packet from the user's hardware may be received at a top of rack (ToR) switch. The ToR may forward the packet to the user's network container and the packet may be received by the filtering platform configured with the SDN policies. The filtering platform applies the SDN policies to the packet and sends the packet to a destination identified in the packet.

In an embodiment, the filtering platform may offload the SDN policies for inbound and outbound traffic associated with the customer's hardware to a programmed device such as the FPGA. After the offload to the FPGA, inbound and outbound traffic associated with the user's hardware may bypass the filtering platform and the user's container. In an embodiment, the FPGA may directly process inbound and outbound traffic associated with the user's hardware.

In an embodiment, when a ToR does not have an effective policy for a network packet, the ToR may offload policy evaluation to the multi-tenant appliance and obtain applicable policies from the multi-tenant appliance, after which the ToR may determine the next hop for the network packet. This policy evaluation need only be done for the first packet. The independent device may update the ToR when a policy becomes invalid.

The described techniques can allow for incorporation of a user's custom hardware while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are

DETAILED DESCRIPTION

In some computing environments that provide virtualized computing and storage services, host networking may be configured to offload tasks to hardware devices. Such devices may be referred to as a hardware acceleration device. For example, a device may be configured to perform computing and communications tasks that are offloaded from the CPU. The device may include hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc., and capable of performing many of the same tasks that are typically accomplished by other devices such as the CPU. The term hardware acceleration device may also encompass other ways of leveraging a hardware acceleration and offloading techniques to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. In some embodiments, the peripheral device may be a network communications device, such as a network interface card (NIC). Such a NIC may be referred to herein as a smartNIC or sNIC.

Various techniques are described herein for implementing an infrastructure virtual network comprising one or more devices that apply SDN policies for a user of virtualized computing services. The described embodiments include a specialized hardware appliance, which leverages the described FPGA (or similar device) and a specialized policy evaluation engine. This specialized hardware appliance may work with devices such as the ToR to provide line rate evaluation of policies and routing of a next hop where a network packet should be forwarded. The specialized hardware appliance may variously be referred to herein as a multi-tenant appliance, SDN appliance, or appliance.

In one example scenario, one or more ToRs may be configured to communicate directly with a network container for packet traffic to and from the user's third-party hardware. The multi-tenant appliance may be implemented that is linked to the user's network container and configured with the SDN policies contained in the network container. In one example, the appliance may include a virtual filtering platform (VFP). A first inbound or outbound data packet is received from/to the user's third-party hardware at the appliance and the SDN policies are applied to those packets using the appliance. The SDN policies of the appliance may be offloaded to the FPGA. Subsequent packet data associated with the user's third-party hardware may be processed using the FPGA, where the FPGA updates the packet data using the SDN policies provided from the appliance.

In one embodiment, the multi-tenant appliance may be deployed by the infrastructure service in the infrastructure virtual network. A virtual network user who desires to incorporate third-party hardware may delegate one subnet in their virtual network to this infrastructure service. The multi-tenant appliance may implement a network container in the user's delegated subnet. The ToR connected to the third-party hardware may be configured to forward all the traffic coming in or going out of the third-party hardware to the appliance except when the traffic is being sent from the appliance.

The multi-tenant appliance may be configured to apply the SDN policies that are configured for the third-party hardware. After applying the SDN policies, the appliance network container may implement a hairpin layer which is configured to redirect the traffic back out on the network. Since the hairpin layer is associated with the appliance, all transformations for the packet on the appliance can be offloaded to the FPGA hardware. Once the traffic is offloaded, the third-party hardware will see traffic at the switching rate without degradation in performance.

Figure 1:
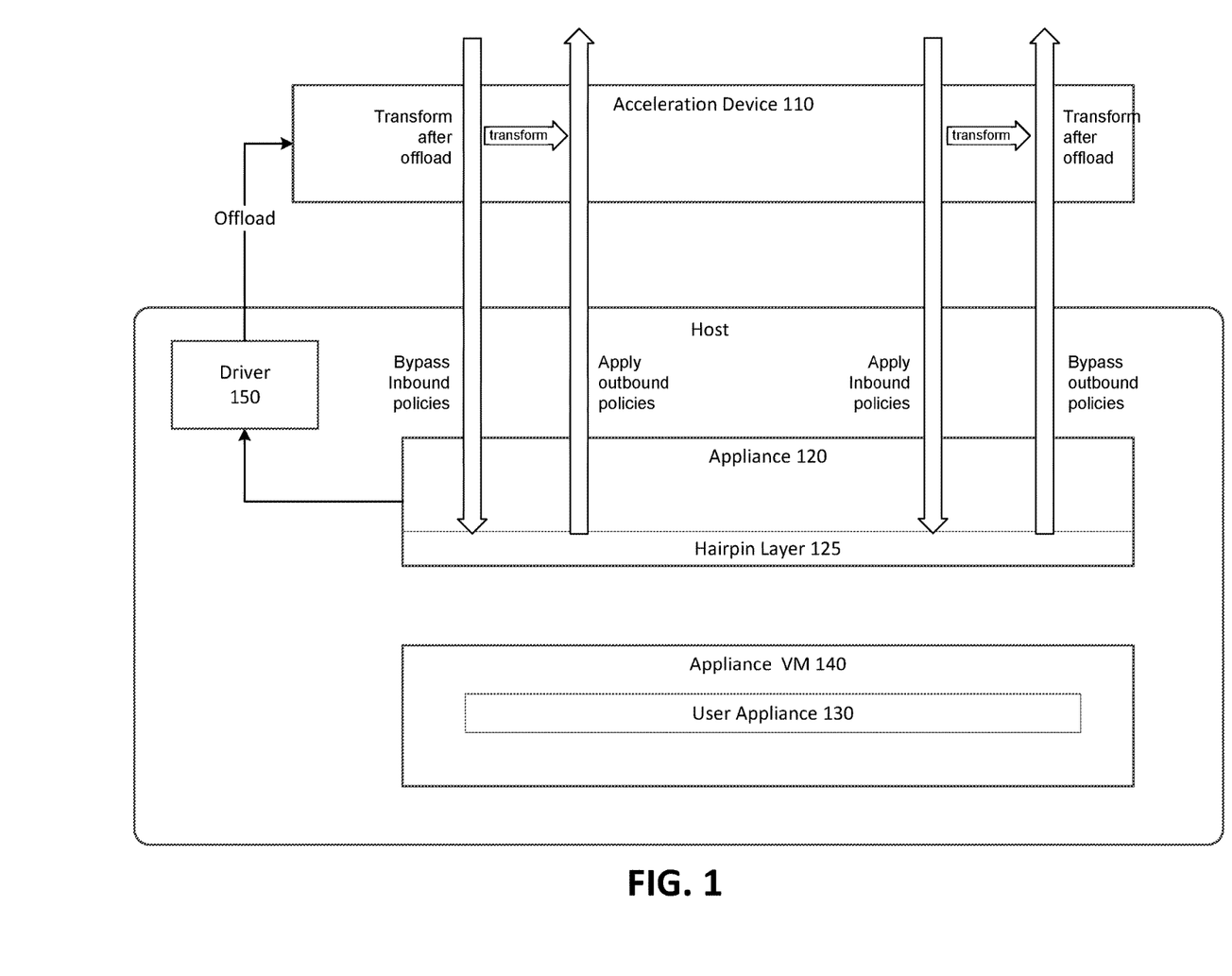
FIG. 1 is a diagram illustrating an example architecture in accordance with the present disclosure.

FIG. 1 illustrates an example data flow in one embodiment, including an acceleration device 110, appliance 120 including hairpin layer 125, third-party appliance 130, and appliance virtual machine 140. The ToR for the third-party hardware may be configured to forward all traffic to the SDN-appliance (e.g., appliance 120) except when the traffic is coming from the appliance.

Packet flow for inbound traffic to the third-party hardware
  The packet arrives at the ToR with source x.x.x.x and destination as the third-party address.
  The ToR forwards the packet to the SDN appliance (e.g., appliance 120).
  The SDN appliance applies the inbound SDN policies to the packet
  The hairpin layer 125 reflects the packet back to the third-party address
  The appliance 120 bypasses all the policies for the returned packet
  The flow may be offloaded to the FPGA 110 so that the next packet will be updated in the FPGA itself.
  Traffic coming from the appliance will be allowed by the ToR to the third-party hardware.

Figure 2A:
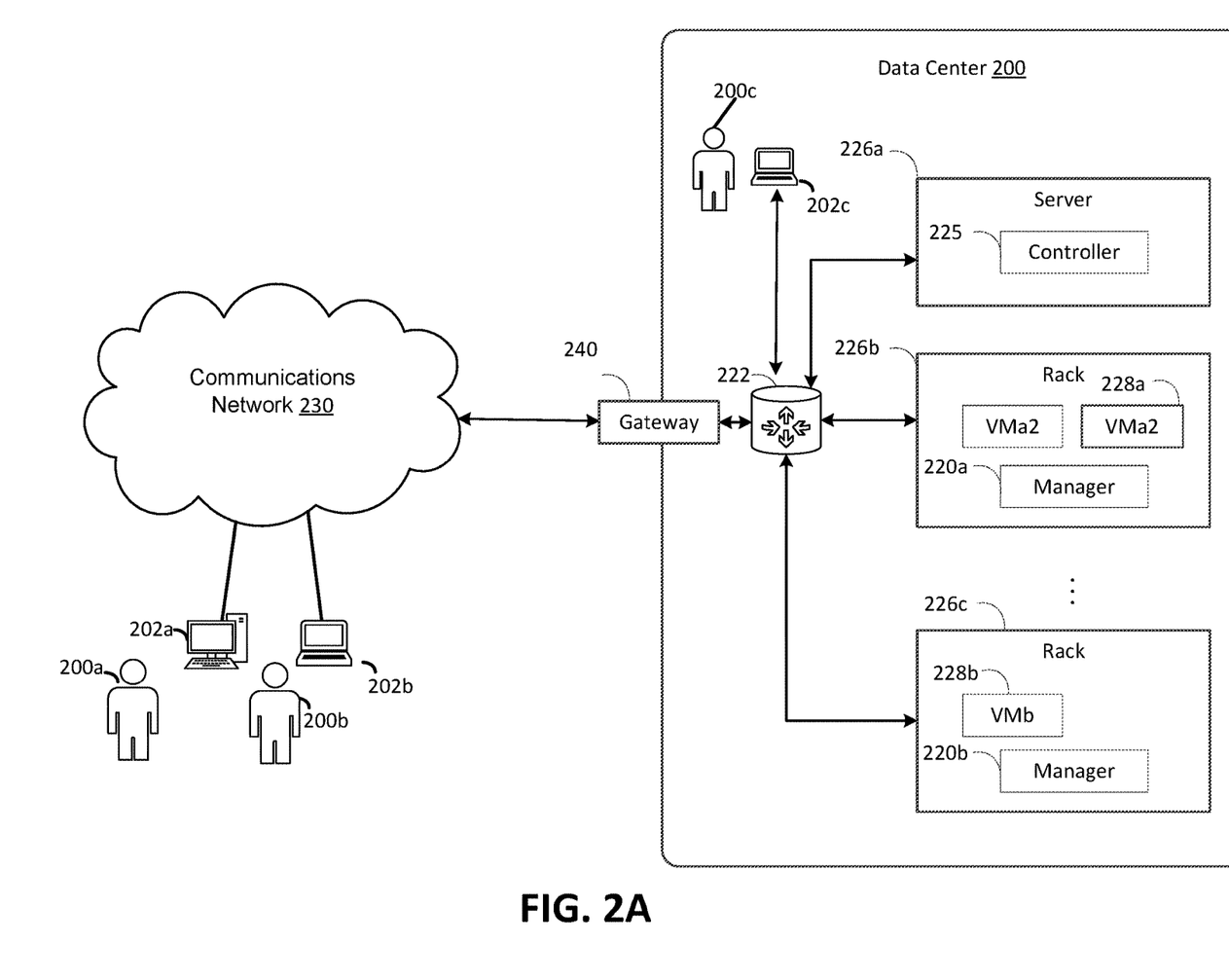
FIG. 2A is a diagram illustrating a data center in accordance with the present disclosure.

Packet flow for outbound traffic from the third-party hardware
  A packet arrives at the ToR with the source as the third-party address and destination as x.x.x.x.
  The ToR forwards the packet to the SDN appliance (e.g., appliance 120)
  The SDN appliance bypasses all the inbound SDN policies on the packet
  The hairpin layer 125 reflects the packet back to destination x.x.x.x
  The SDN appliance (appliance 120) applies all outbound SDN policies and sends the packet out to x.x.x.x
  The flow is offloaded to the FPGA 110 so that the next packet will be updated in the FPGA itself FIG. 2A illustrates an example computing environment in which the embodiments described herein may be implemented. FIG. 2A illustrates a data center 200 that is configured to provide computing resources to users 200a, 200b, or 200c (which may be referred herein singularly as "a user 200" or in the plural as "the users 200") via user computers 202a, 202b, and 202c (which may be referred herein singularly as "a computer 202" or in the plural as "the computers 202") via a communications network 230. The computing resources provided by the data center 200 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 200 may include servers 226a, 226b, and 226c (which may be referred to herein singularly as "a server 226" or in the plural as "the servers 226") that provide computing resources available as virtual machines 228a and 228b (which may be referred to herein singularly as "a virtual machine 228" or in the plural as "the virtual machines 228"). The virtual machines 228 may be configured to execute applications such as Web servers, application servers, media servers, database servers, and the like. Other resources that may be provided include data storage resources (not shown on FIG. 2A) and may include file storage devices, block storage devices, and the like. Servers 226 may also execute functions that manage and control allocation of resources in the data center, such as a controller 225. Controller 225 may be a fabric controller or another type of program configured to manage the allocation of virtual machines on servers 226.

Referring to FIG. 2A, communications network 230 may, for example, be a publicly accessible network of linked networks and may be operated by various entities, such as the Internet. In other embodiments, communications network 230 may be a private network, such as a corporate network that is wholly or partially inaccessible to the public.

Communications network 230 may provide access to computers 202. Computers 202 may be computers utilized by users 200. Computer 202a, 202b or 202c may be a server, a desktop or laptop personal computer, a tablet computer, a smartphone, a set-top box, or any other computing device capable of accessing data center 200. User computer 202a or 202b may connect directly to the Internet (e.g., via a cable modem). User computer 202c may be internal to the data center 200 and may connect directly to the resources in the data center 200 via internal networks. Although only three user computers 202a, 202b, and 202c are depicted, it should be appreciated that there may be multiple user computers.

Computers 202 may also be utilized to configure aspects of the computing resources provided by data center 200. For example, data center 200 may provide a Web interface through which aspects of its operation may be configured through the use of a Web browser application program executing on user computer 202. Alternatively, a stand-alone application program executing on user computer 202 may be used to access an application programming interface (API) exposed by data center 200 for performing the configuration operations.

Servers 226 may be configured to provide the computing resources described above. One or more of the servers 226 may be configured to execute a manager 220a or 220b (which may be referred herein singularly as "a manager 220" or in the plural as "the managers 220") configured to execute the virtual machines. The managers 220 may be a virtual machine monitor (VMM), fabric controller, or another type of program configured to enable the execution of virtual machines 228 on servers 226, for example.

It should be appreciated that although the embodiments disclosed above are discussed in the context of virtual machines, other types of implementations can be utilized with the concepts and technologies disclosed herein.

In the example data center 200 shown in FIG. 2A, a network device 222 may be utilized to interconnect the servers 226a and 226b. Network device 222 may comprise one or more switches, routers, or other network devices. Network device 222 may also be connected to gateway 240, which is connected to communications network 230. Network device 222 may facilitate communications within networks in data center 200, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2A has been greatly simplified and that many more networks and networking devices may be utilized to interconnect the various computing systems disclosed herein. These network topologies and devices should be apparent to those skilled in the art.

It should also be appreciated that data center 200 described in FIG. 2A is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2B:
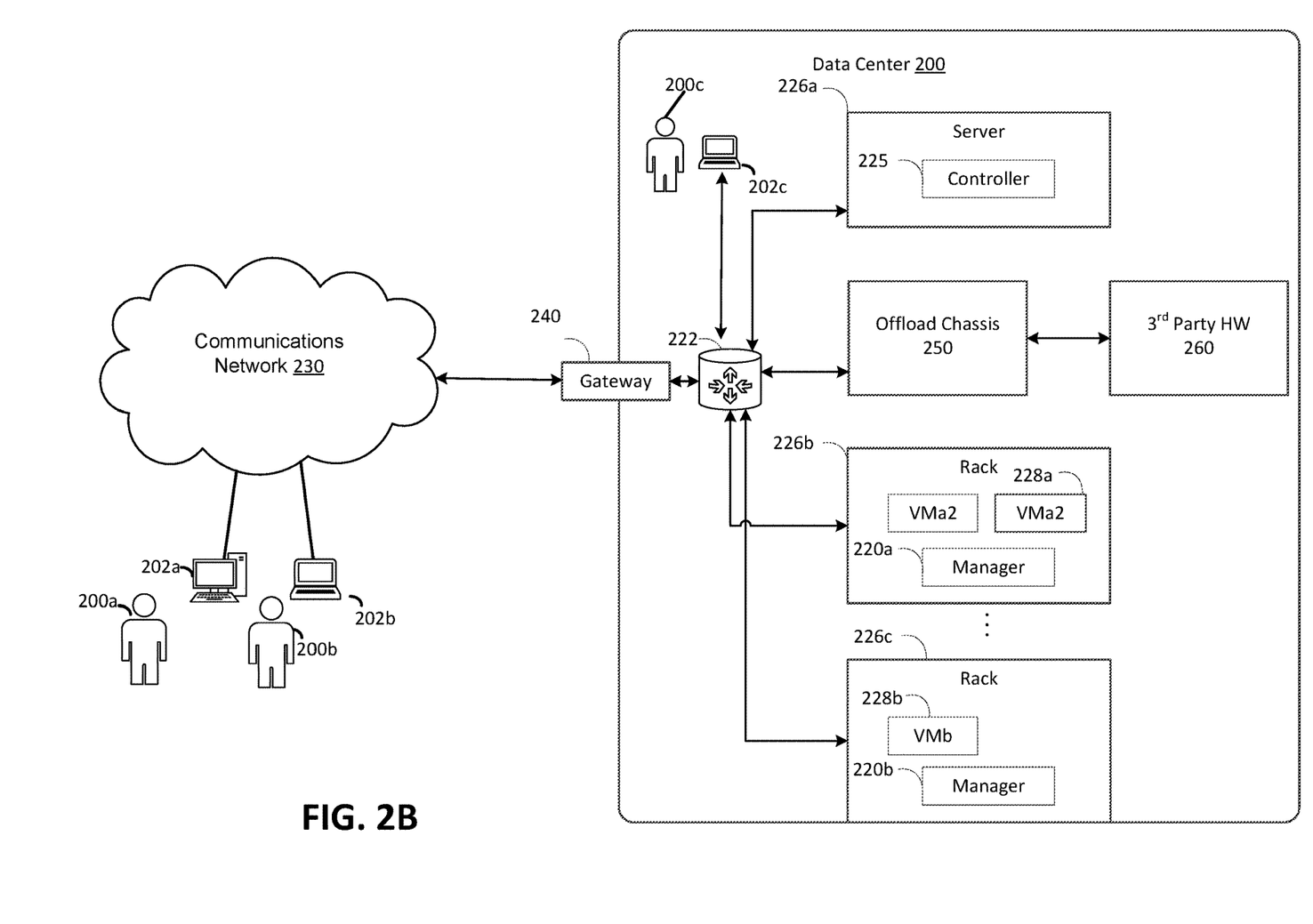
FIG. 2B is a diagram illustrating a data center in accordance with the present disclosure.

FIG. 2B illustrates an example computing environment illustrating integration of third-party devices 260 in accordance with the present disclosure. In one embodiment, a multi-tenant appliance 250 may be implemented. In an embodiment, the multi-tenant appliance 250 may provide one network container for each tenant that implements third-party hardware. Each network container may have a hairpin layer to reflect the packets from the third-party devices 260 before the packets reach virtual machines 228a and 228b. The policy rules (e.g., VFP rules) can be offloaded to off-board accelerator devices (e.g., FPGA) so that data traffic may be processed in hardware, avoiding software-based processing and thus reducing latency.

Figure 3:
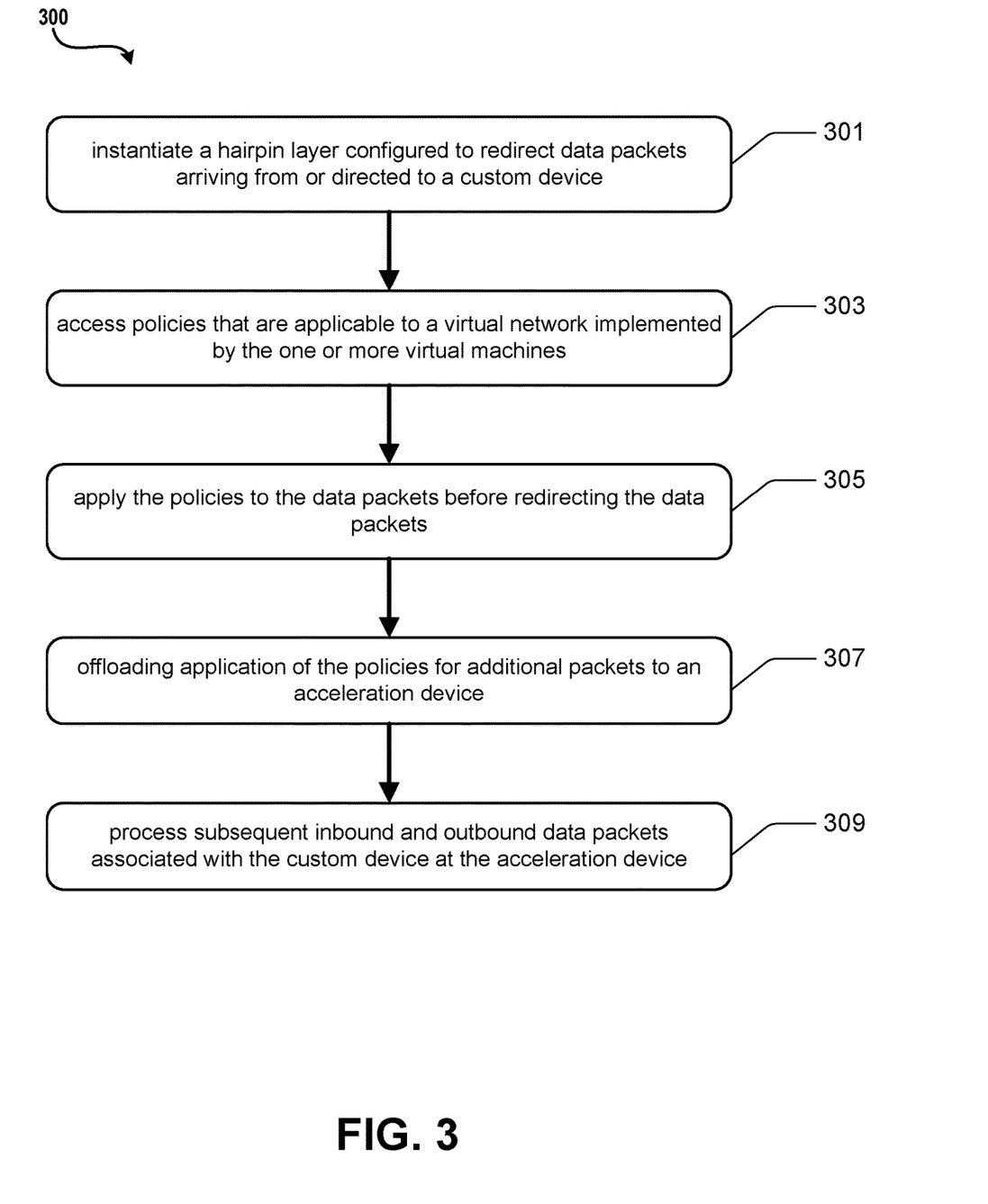
FIG. 3 is a flowchart depicting an example procedure for implementing a virtual network including one or more custom devices in accordance with the present disclosure.

Turning now to FIG. 3, illustrated is an example operational procedure for implementing a virtual network including one or more custom devices that are associated with a user in accordance with the present disclosure. Referring to FIG. 3, operation 301 illustrates instantiating a hairpin layer configured to redirect data packets arriving from or directed to a custom device.

Operation 301 may be followed by operation 303. Operation 303 illustrates accessing policies that are applicable to a virtual network implemented by the one or more virtual machines.

Operation 303 may be followed by operation 305. Operation 305 illustrates applying the policies to the data packets before redirecting the data packets. Operation 305 may be followed by operation 307. Operation 307 illustrates offloading application of the policies for additional packets to an acceleration device. Operation 307 may be followed by operation 309. Operation 309 illustrates processing subsequent inbound and outbound data packets associated with the custom device at the acceleration device.

In an embodiment, the acceleration device is an FPGA. In an embodiment, the appliance is part of a network container configured to implement a data interface to the custom device.

In an embodiment, the appliance comprises a plurality of network containers configured to implement data interfaces to a plurality of custom devices. In an embodiment, the custom device is part of a virtual network. In some embodiments, a subnet of the virtual network is designated for the custom device.

Figure 4:
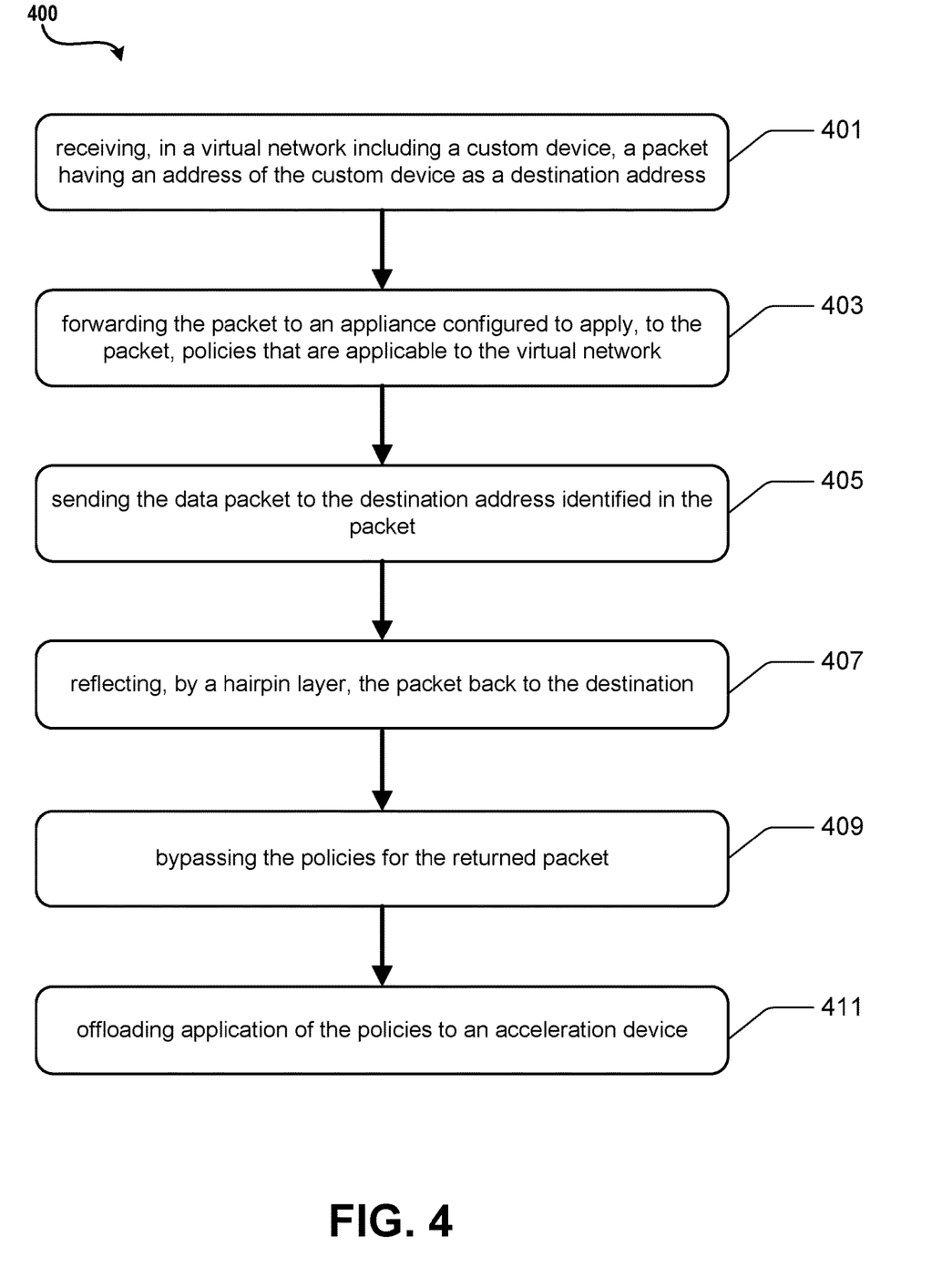
FIG. 4 is a flowchart depicting an example procedure for implementing a virtual network including one or more custom devices in accordance with the present disclosure.

Referring to FIG. 4, illustrated is another example operational procedure for implementing a virtual network including one or more custom devices that are associated with a user. Referring to FIG. 4, operation 401 illustrates receiving, in a virtual network including a custom device, a packet having an address of the custom device as a destination address.

Operation 401 may be followed by operation 403. Operation 403 illustrates forwarding the packet to an appliance configured to apply, to the packet, policies that are applicable to the virtual network.

Operation 403 may be followed by operation 404. Operation 405 illustrates sending, by the custom device, the data packet to the destination address identified in the packet.

Operation 405 may be followed by operation 407. Operation 407 illustrates reflecting, by a hairpin layer, the packet back to the destination.

Operation 407 may be followed by operation 409. Operation 409 illustrates bypassing, by the platform, the policies for the returned packet.

Operation 409 may be followed by operation 411. Operation 411 illustrates offloading application of the policies to an acceleration device.

Figure 5:
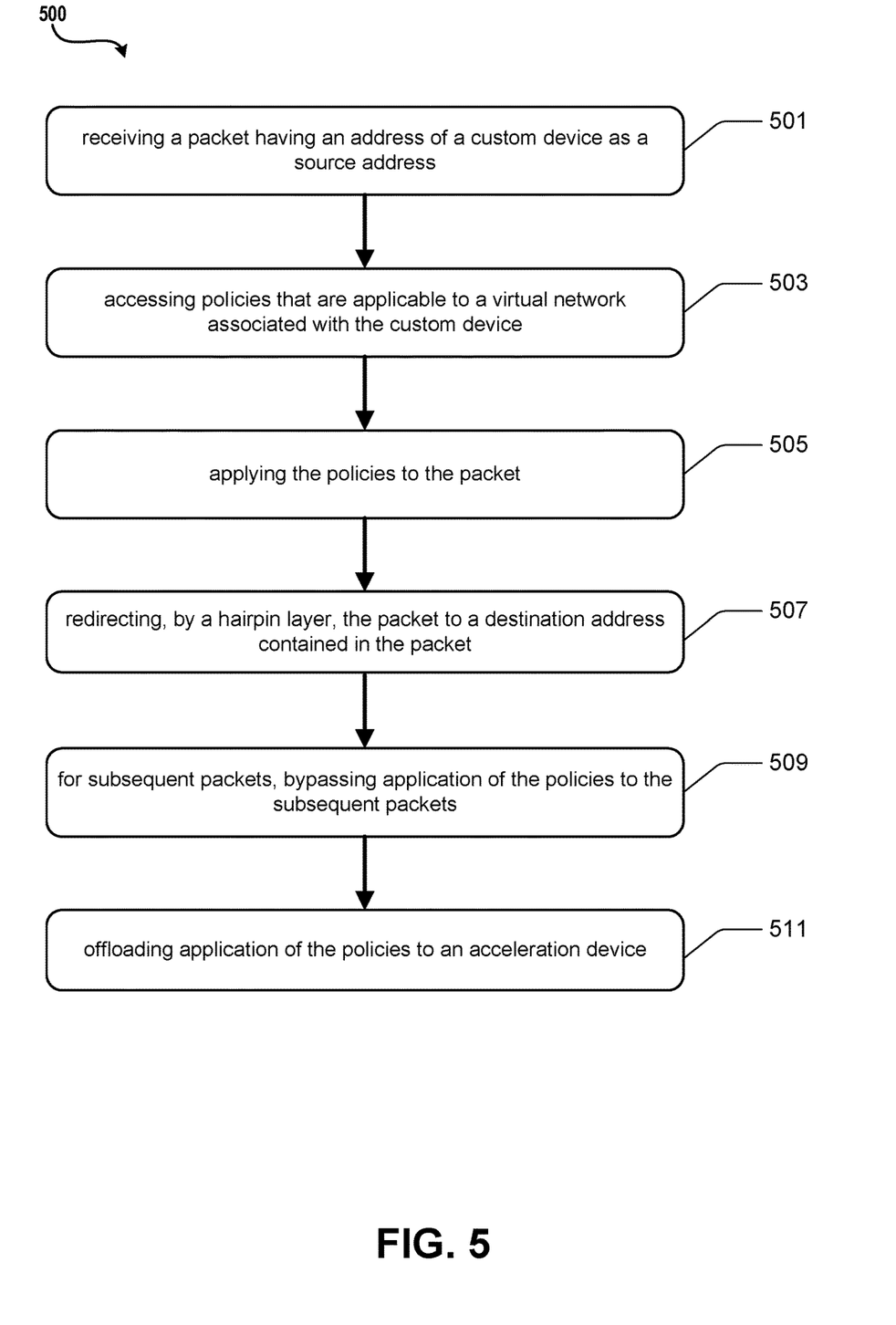
FIG. 5 is a flowchart depicting an example procedure for implementing a virtual network including one or more custom devices in accordance with the present disclosure.

Referring to FIG. 5, illustrated is another example operational procedure for implementing a virtual network including one or more custom devices that are associated with a user. Referring to FIG. 5, operation 501 illustrates receiving a packet having an address of a custom device as a source address.

Operation 501 may be followed by operation 503. Operation 503 illustrates accessing policies that are applicable to a virtual network associated with the custom device.

Operation 503 may be followed by operation 505. Operation 505 illustrates applying the policies to the packet.

Operation 505 may be followed by operation 507. Operation 507 illustrates redirecting, by a hairpin layer, the packet to a destination address contained in the packet.

Operation 507 may be followed by operation 509. Operation 509 illustrates for subsequent packets, bypassing application of the policies to the subsequent packets.

Operation 509 may be followed by operation 511. Operation 511 illustrates offloading application of the policies to an acceleration device.

In an embodiment, the acceleration device is an FPGA. In an embodiment, the device comprises a network container configured to implement a data interface to the custom device.

In an embodiment, the device comprises a plurality of network containers configured to implement data interfaces to a plurality of custom devices. In an embodiment, the custom device is part of a virtual network. In an embodiment, a subnet of the virtual network is designated for the custom device.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc. A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 6:
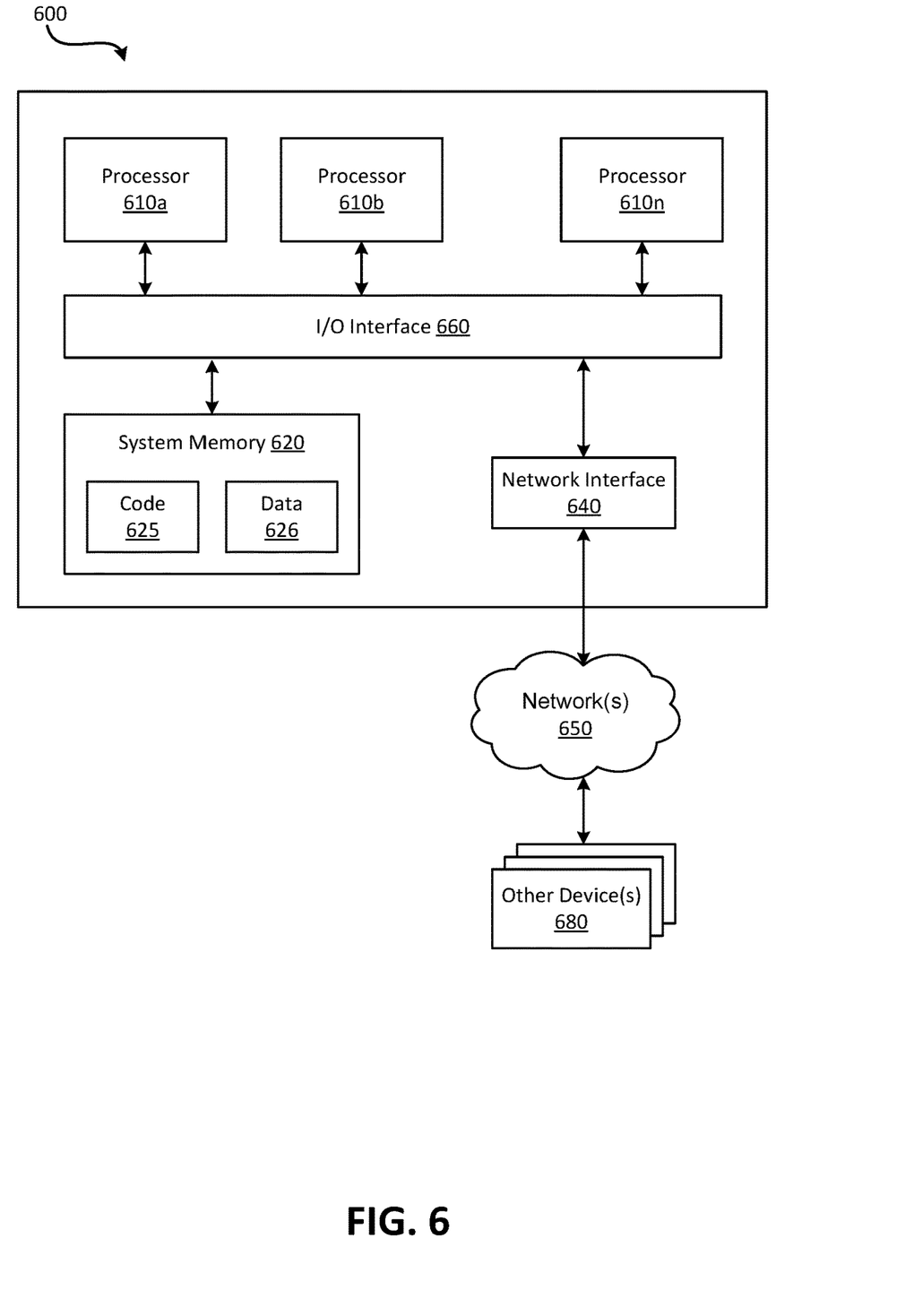
FIG. 6 is an example computing device in accordance with the present disclosure.

FIG. 6 illustrates a general-purpose computing device 600. In the illustrated embodiment, computing device 600 includes one or more processors 610a, 610b, and/or 610n (which may be referred herein singularly as "a processor 610" or in the plural as "the processors 610") coupled to a system memory 66 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 66 may be configured to store instructions and data accessible by processor(s) 610. In various embodiments, system memory 66 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between the processor 610, system memory 66, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or network(s) 660, such as other computer systems or devices as illustrated in FIGS. 1 through 5, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for FIGS. 1-5 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system configured to implement virtual networks for a plurality of tenants of a multi-tenant virtual computing network, the system comprising:
   one or more servers configured to instantiate one or more virtual machines of a virtual network associated with a tenant of the multi-tenant virtual computing network; and
   an appliance communicatively coupled to a tenant device associated with the tenant of the multi-tenant virtual computing network, wherein the tenant device is configured as an endpoint in the virtual network associated with the tenant, the appliance configured to:
      receive, via a first redirection by a hairpin layer of the appliance, first data packets arriving from the tenant device that are directed to the one or more virtual machines of the virtual network associated with the tenant of the multi-tenant virtual computing network;
      receive, via a second redirection by the hairpin layer, second data packets directed to the tenant device as the endpoint in the virtual network from the one or more virtual machines of the virtual network associated with the tenant of the multi-tenant virtual computing network;
      access policies that are applicable to the virtual network associated with the tenant of the multi-tenant virtual computing network;
      apply one of the policies to the first data packets and the second data packets;
      redirect the first data packets to the virtual network associated with the tenant of the multi-tenant virtual computing network;
      redirect the second data packets to the tenant device; and
      offload application of the one of the policies for additional data packets to an acceleration device associated with the appliance.

2. The system of claim 1, wherein the acceleration device is an FPGA.

3. The system of claim 1, wherein the appliance comprises a network container configured to implement a data interface to the tenant device.

4. The system of claim 1, wherein the appliance comprises a plurality of network containers configured to implement data interfaces to a plurality of tenant devices.

5. The system of claim 1, wherein a subnet of the virtual network associated with the tenant of the multi-tenant virtual computing network is designated for the tenant device.

6. A method for implementing a virtual network of a tenant of a multi-tenant virtual computing network, the virtual network associated with the tenant of the multi-tenant virtual computing network, wherein a tenant device is configured as an endpoint in the virtual network associated with the tenant, the method comprising:
   receiving, by a first redirection by a hairpin layer of an appliance communicatively coupled to the tenant device, first data packets arriving from the tenant device that are directed to one or more virtual machines of the virtual network associated with the tenant of the multi-tenant virtual computing network;
   receiving, via a second redirection by the hairpin layer, second data packets directed to the tenant device as the endpoint in the virtual network from the one or more virtual machines of the virtual network associated with the tenant of the multi-tenant virtual computing network;
   accessing policies that are applicable to the virtual network associated with the tenant of the multi-tenant virtual computing network;
   applying, to the first and second data packets, one of the policies;
   redirecting the first data packets to the virtual network associated with the tenant of the multi-tenant virtual computing network;
   redirecting the second data packets to the tenant device; and
   offloading application of the applicable policies to subsequent packets to an acceleration device associated with the appliance.

7. The method of claim 6, wherein the acceleration device is an FPGA.

8. The method of claim 6, wherein the appliance comprises a network container configured to implement a data interface to the tenant device.

9. The method of claim 6, wherein the appliance comprises a plurality of network containers configured to implement data interfaces to a plurality of tenant devices.

10. The method of claim 6, wherein a subnet of the virtual network associated with the tenant of the multi-tenant virtual computing network is designated for the tenant device.

11. An appliance comprising:
   one or more processors;
   an acceleration device;
   a memory in communication with the one or more processors, the memory having computer-readable instructions stored thereupon which, when executed by the one or more processors, cause the device perform operations comprising:
   receiving, by a first redirection by a hairpin layer of the appliance, first data packets arriving from a tenant device that are directed to one or more virtual machines of a virtual network associated with a tenant of a multi-tenant virtual computing network;
   receiving, via a second redirection by the hairpin layer, second data packets directed to the tenant device as an endpoint in the virtual network from the one or more virtual machines of the virtual network associated with the tenant of the multi-tenant virtual computing network;
   accessing policies that are applicable to the virtual network associated with the tenant;
   applying one of the policies to the first data packets and the second data packets;
   redirecting the first data packets to the virtual network associated with the tenant of the multi-tenant virtual computing network;
   redirecting the second data packets to the tenant device; and
   offloading application of the one of the policies for additional data packets to the acceleration device.

12. The appliance of claim 11, wherein the acceleration device is an FPGA.

13. The appliance of claim 11, wherein the appliance comprises a network container configured to implement a data interface to the tenant device.

14. The appliance of claim 11, wherein the appliance comprises a plurality of network containers configured to implement data interfaces to a plurality of tenant devices.

15. The appliance of claim 11, wherein a subnet of the virtual network is designated for the tenant device.

* * * * *